United States Patent
O'Connor

(12)
(10) Patent No.: US 6,253,484 B1
(45) Date of Patent: Jul. 3, 2001

(54) FISHING ROD HOLDER

(76) Inventor: Daniel J. O'Connor, 301 State St., Guilford, CT (US) 06437

( * ) Notice: Subject to any disclaimer, the term of this patent is extended or adjusted under 35 U.S.C. 154(b) by 0 days.

(21) Appl. No.: 09/442,580

(22) Filed: Nov. 18, 1999

(51) Int. Cl.$^7$ .................................................. A01K 97/10
(52) U.S. Cl. ......................... 43/21.2; 248/213.2; 248/538
(58) Field of Search ................................ 43/21.2; 24/557, 24/565; 248/538, 213.2; 211/70.8; D22/147

(56) References Cited

U.S. PATENT DOCUMENTS

| | | | |
|---|---|---|---|
| D. 173,260 | * 10/1954 | Emanatian | D22/147 |
| D. 176,013 | * 11/1955 | Hamel | D22/147 |
| D. 283,909 | 5/1986 | Hoover | D22/147 |
| D. 285,409 | 9/1986 | Lemkin et al. | D8/356 |
| 496,537 | * 5/1893 | Purrington | 248/213.2 |
| 545,024 | * 8/1895 | Rogers | 248/213.2 |
| 1,928,995 | * 10/1933 | De Biasi | 24/213.2 |
| 2,331,452 | * 10/1943 | Briggs | 24/565 |
| 2,481,952 | * 9/1949 | Schwartz et al. | 24/557 |
| 2,506,783 | * 5/1950 | Fauteux, Jr. | 24/564 |
| 2,543,336 | * 2/1951 | Ratchford | 24/557 |
| 2,552,879 | * 5/1951 | Woerner | 211/70.8 |
| 2,798,684 | * 7/1957 | Walden | D22/147 |
| 3,194,248 | * 7/1965 | Callies | 24/557 |
| 3,601,919 | 8/1971 | Nixon et al. | 43/21.2 |
| 3,603,019 | 9/1971 | Smeltzer | 43/21.2 |
| 3,659,369 | 5/1972 | Hermanson | 43/21.2 |
| 3,731,817 | 5/1973 | Fowlkes et al. | 211/70.8 |
| 3,792,829 | 2/1974 | Fickett | 248/534 |
| 3,835,568 | 9/1974 | Whitfield | 43/17 |
| 3,858,833 | 1/1975 | Fink | 248/533 |
| 3,876,076 | 4/1975 | Hazelhurst | 211/4 |
| 3,945,143 | 3/1976 | Schmitt, Sr. | 43/17 |
| 4,050,178 | 9/1977 | Bryan | 43/21.2 |
| 4,106,811 | * 8/1978 | Hernandez | 43/21.2 |
| 4,149,299 | * 4/1979 | Welsh | 24/557 |
| 4,156,982 | 6/1979 | Phillips | 43/21.2 |
| 4,479,628 | * 10/1984 | Albright | 43/21.2 |
| 4,485,578 | * 12/1984 | Novey | 43/21.2 |
| 4,517,761 | 5/1985 | Bleggi | 43/21.2 |
| 4,550,520 | 11/1985 | Bogue | 43/21.2 |
| 4,582,203 | 4/1986 | Davis | 211/70.8 |

(List continued on next page.)

FOREIGN PATENT DOCUMENTS

2674099 * 9/1992 (FR) .
2-207730 * 8/1990 (JP) .

Primary Examiner—Darren W. Ark
(74) Attorney, Agent, or Firm—Fay, Sharpe, Fagan, Minnich & McKee, LLP

(57) ABSTRACT

A fishing rod holder (H) includes a first leg (12) having an inner edge (14) in direct contact with an inner surface (18) of a vertical sidewall (20) of a bucket (B) or other support object. A second leg (28) having a length shorter than the first leg is disposed parallel to the first leg. The second leg is in direct contact with an outer surface (34) of the vertical sidewall (20) of the bucket. The first leg and the second leg define a slot (42) which receives the vertical sidewall (20). An arm (60) extends from an upper end (38) of the second leg. The arm (60) includes a first portion (62) extending upward from the second leg at an angle away from the first leg and a second portion (64) extending upward from the arm first portion at a negative angle. The arm lower and upper portions each include an inner side (66, 68). A bridge (44) spans a top end (24) of the first leg and an upper end of the second leg, interconnecting the first leg and the second leg. The bridge includes a side (48) extending upward from the inner side of the arm lower portion in parallel relation with the inner side (68) of the arm upper portion. The side (48) of the bridge and the inner sides (66, 68) of the arm lower and upper portions define a channel (74) for supporting a fishing rod (F).

18 Claims, 2 Drawing Sheets

U.S. PATENT DOCUMENTS

| | | | |
|---|---|---|---|
| 4,594,805 | 6/1986 | McClelland | 43/21.2 |
| 4,611,427 | 9/1986 | Coutcher | 43/21.2 |
| 4,650,146 | 3/1987 | Duke | 248/512 |
| 4,841,660 | 6/1989 | James | 43/21.2 |
| 4,848,021 | 7/1989 | Simko | 43/21.2 |
| 4,854,069 | 8/1989 | Smith et al. | 43/21.2 |
| 4,961,505 | 10/1990 | Moeller | 211/70.8 |
| 5,131,179 * | 7/1992 | McEwen | 43/21.2 |
| 5,152,494 | 10/1992 | Frunxar | 248/513 |
| 5,335,440 * | 8/1994 | Williams | 43/21.2 |
| 5,491,923 * | 2/1996 | Zingrone | 43/21.2 |
| 5,533,295 | 7/1996 | Hochberger | 43/21.2 |
| 5,571,228 * | 11/1996 | McMurtrie | 43/21.2 |
| 5,573,167 * | 11/1996 | Bebb et al. | 43/21.2 |
| 5,657,883 | 8/1997 | Badia | 211/70.8 |
| 5,662,299 * | 9/1997 | Mejia | 248/213.2 |
| 5,730,405 * | 3/1998 | Nichols, IV | 248/213.2 |
| 5,853,157 * | 12/1998 | O'Donnell | 248/213.2 |
| 5,913,673 | 6/1999 | Womac | 43/54.1 |
| 5,934,004 * | 8/1999 | Koe | 43/21.2 |
| 6,010,107 * | 1/2000 | Goldfarb | 248/538 |

* cited by examiner

FISHING ROD HOLDER

BACKGROUND OF THE INVENTION

The present invention relates generally to a device for holding rods or poles during fishing operations. The invention finds particular application in a fishing rod holder adapted to be removably secured to a pail, bucket, or similar container with a vertical side. It will be appreciated, however, that the invention will also find application in conjunction with rod and pole holders that mount on other types of support structures.

Commonly, fishing rods include an elastic fiberglass or graphite elongated rod having a series of graduated line guides attached along their length. A handle is disposed at one end allowing the fisherman to hold the rod during operation. The handle includes a rearward butt and a forward grip. Between the butt and foregrip of a conventional fishing rod is a reel seat adapted to secure the foot of a spin casting reel. When such a fishing rod is used by a right-handed operator, the operator's left hand grasps the butt end of the handle while the operator's right hand selectively grasps the foregrip or the crank handle of the spin cast reel. When a fisherman's hands are in this position, he may maneuver and position the fishing line extending through the graduated guides along the pole.

A well known type of fishing involves casting. During casting, a fisherman casts his line into the water and reels the line in by turning the crank handle. However, fisherman frequently wish to fish without holding a rod in their hands. Holding the rod during repeated casting and long periods of inactivity can be tiring causing fatigue. In addition, a fisherman needs to tend to other chores while fishing, such as cutting and preparing bait, which generally requires letting go of the fishing rod. During these times of fatigue and conducting other tasks, which require the fisherman to put his pole down, it is desirable to continue fishing. In addition, it is often desirable to fish more than one fishing rod at a time.

In order to free themselves from having to hold a fishing rod at all times during fishing, fisherman have devised a variety of rod-holding devices. Originally, fisherman impaled their fishing rods in the ground or braced their fishing rods with rocks, railings, or the like. Over the years, however, fishing rod holders have become more developed.

The conventional holding device for use on a fishing boat consists of a holding receptacle that is adapted to receive the fishing rod. A bracket is used to secure this receptacle to the boat or optionally the receptacle is built into the gunwales of the boat. Conventional rod holders are commonly secured to the boat through the use of screws, brackets, or holes drilled or molded into the gunwales. These devices suffer from several drawbacks. One such drawback is the need to drill holes or make other modifications to facilitate the attachment of the holding devices to the boat. Another drawback is the inability to move the device to another location without making further modifications to the boat.

Similar devices have also been used when fishing from shore. One conventional rod holder used when fishing from shore includes a hollow tube which is thrust into the ground. The rod is inserted into the opened end of the tube and is supported by the tube while the fisherman waits for a fish to strike the bait. This allows the fisherman to carry on other activities without holding onto the rod. When a fish strikes the bait, the rod is removed from the rod holder and the fish is played in a normal manner.

The foregoing conventional fishing rod holders are complicated in structure, expensive to manufacture, and difficult to use. Many are large or awkward to carry. Some require multiple parts or moving parts in a complex configuration increasing costs and complexity. Many are not capable of effective use on both a boat and on shore.

Thus, a need exists to provide a new and useful rod holder that is simple, easy to manufacture, easy to carry and use, and effective. The present invention contemplates a new apparatus which overcomes the above-referenced problems and others.

SUMMARY OF INVENTION

In accordance with one aspect of the present invention, a fishing rod holder includes a first leg. The first leg has an inner edge for direct contact with an inner surface of a vertical sidewall of a support object. The rod holder also includes a second leg having a shorter length than the first leg and disposed parallel to the first leg. The second leg has an upright edge for direct contact with an outer surface of the vertical sidewall of the support object. The first leg and the second leg define a slot. An elbow protrudes upward from the second leg. The elbow includes a first portion extending upward from the second leg at an angle away from the first leg. The elbow also includes a second portion extending upward from the first portion of the elbow at a negative angle. The first portion and the second portion each have an inner side and an outer side. A bridge spans a top end of the first leg and an upper end of the second leg interconnecting the first and second legs. The bridge has an edge extending upward from the inner side of the first portion of the elbow. The edge of the bridge and the inner sides of the first and second portions of the elbow define a channel for receiving a fishing rod.

In accordance with another aspect of the present invention, a fishing rod holder includes a body that has first and second parallel surfaces. The first and second surfaces define a first slot dimensioned for receiving an upper edge of a sidewall of a bucket. The holder further has third and fourth surfaces that define a second slot for receiving a fishing rod. The second slot is offset from the first slot and extends in an opposing direction. As such, when the first slot is received on the bucket sidewall, the second slot is displaced outward from the bucket sidewall and opens upward so that the fishing rod can rest by gravity therein.

In accordance with another aspect of the present invention a portable fishing rod holder includes a first leg. The first leg has an inner edge frictionally engaging an inner surface of a vertical sidewall of a support object. The rod holder further includes a second leg disposed parallel to the first leg. The second leg has an upright edge frictionally engaging an outer surface of the vertical sidewall of the support object. The first leg and the second leg define a slot. A bridge spans a top end of the first leg and an upper end of the second leg interconnecting the first and second legs. An arm having an inner side and an outer side protrudes upward from the second leg of the fishing rod holder. A surface extends upward from the inner side of the arm. The surface and the inner side of the arm define a channel.

One advantage of the present invention resides in its simplicity.

Another advantage of the present invention is that it is easy and cost effective to manufacture.

Another advantage of the present invention is that it is amenable to carrying advertising messages.

Another advantage of the present invention resides in its ready portability.

Another advantage of the present invention is that a fisherman can use the fishing rod holder on a boat or on land.

Yet another advantage of the present invention is the unique design of the fishing rod holder which prevents the fishing pole from inadvertently popping out of the rod holder.

Still further advantages will become apparent to those of ordinary skill in the art upon reading and understanding the following detailed description.

BRIEF DESCRIPTION OF THE DRAWINGS

The invention may take form in various components and arrangements of components. The drawings are only for purposes of illustrating preferred embodiments and are not to be construed as limiting the invention.

DETAILED DESCRIPTION OF THE PREFERRED EMBODIMENTS

Figure 1:
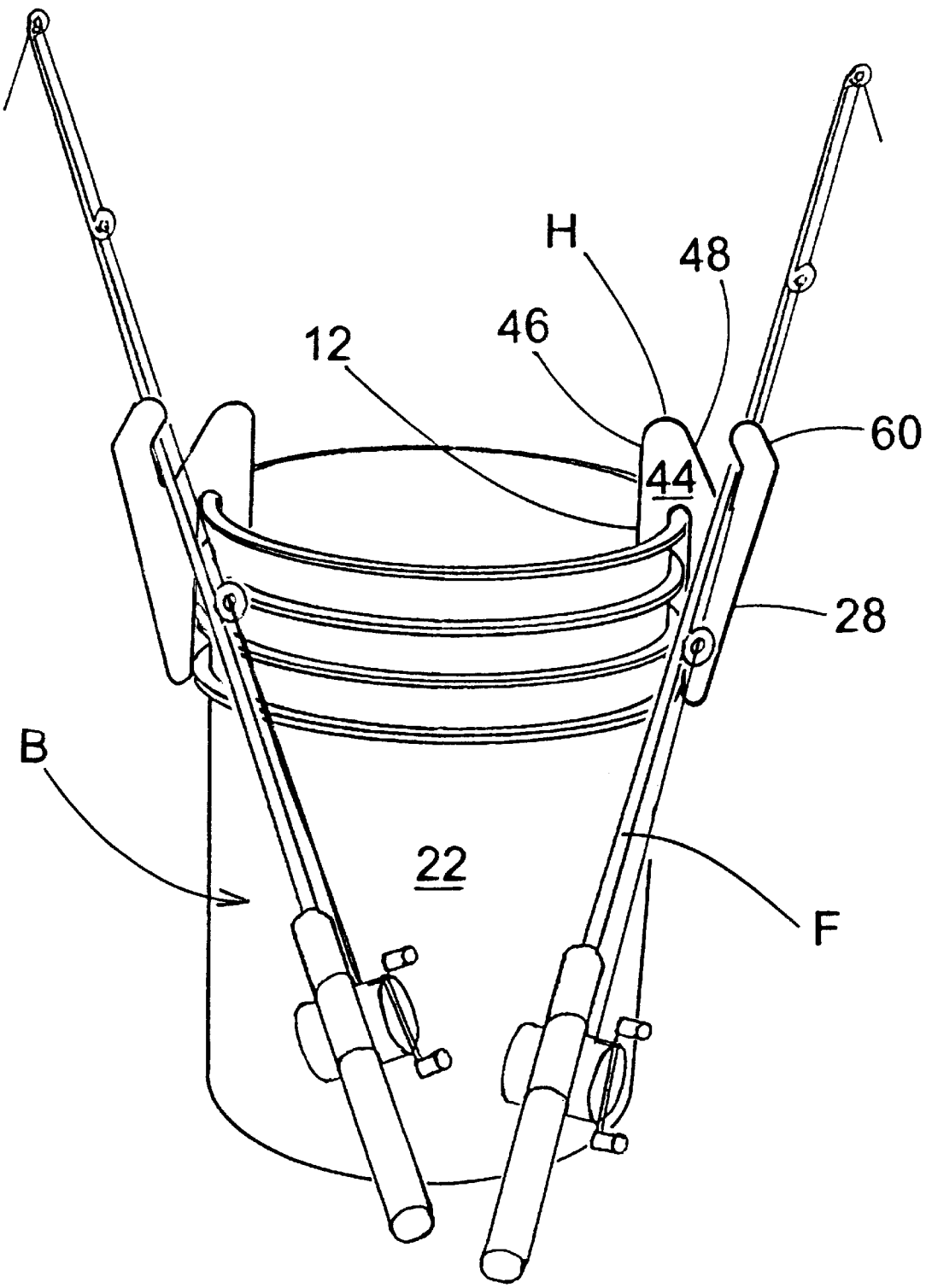
FIG. 1 is a perspective view of a rod holding device in accordance with the present invention in combination with a bucket and fishing pole.

With reference to FIG. 1, a rod holding device H is received on a bucket B, such as a bait bucket. A fishing rod F is supported at an angled orientation with its butt end resting on the ground and a mid-portion resting on the holder E.

Figure 2:
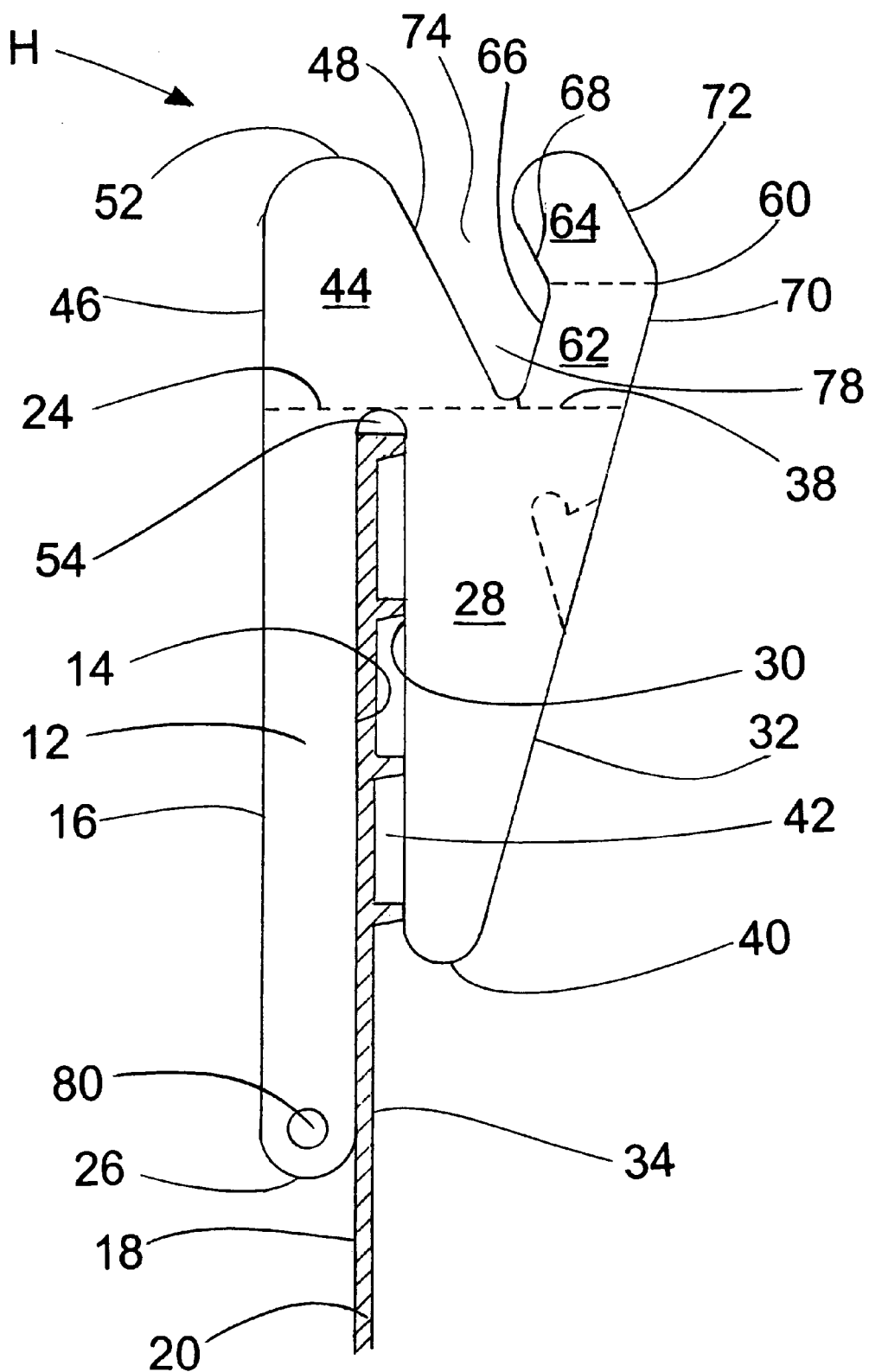
FIG. 2 is a plan view of a rod holding device in accordance with the present invention in combination with an upper edge of a bucket operating in partial section.

With continuing reference to FIG. 1 and further reference to FIG. 2, a first leg 12 of the holder H is generally planar having a linear inner edge 14 and an outer edge 16. The planar first leg provides a flat expanse that is ideal for receiving an advertising message. In use, the first leg 12 is positioned vertically so that its inner edge 14 is in direct contact with an inner surface 18 of a generally vertical sidewall 20 of the bucket B. Although the FIGURES illustrate the sidewall 20 of the bucket, it will be appreciated that other objects or containers having a vertical side, such as a pail or tackle box, are also contemplated. The first leg 12 has a top end 24 and a bottom end 26 spanning a length of approximately five inches (about 10–15 cm). However, other lengths are contemplated by the present invention.

A second generally planar leg 28 has a linear edge 30 and a sloped edge 32. The linear edge 30 of the second leg 28 is disposed parallel to the first leg linear edge 14 and spaced from it by the effective width of the sidewall 20 of the bucket. In this manner, the second leg linear edge 30 directly engages an outer surface 34 of the sidewall 20 as the first leg linear edge engages the inner surface of the sidewall. The sloped edge 32 of the second leg 28 is angled having a positive slope. The flat surface of the second leg presents an ideal location for an advertising logo or other message. In a preferred embodiment, the angle of the sloped edge 32 is approximately 75° relative to horizontal. In use, the second leg 28 is vertically disposed having an upper end 38 and a lower end 40. The second leg 28 is preferably shorter than the first leg 12, having a length of approximately three and a half inches (about 7–10 cm). The first leg 12 and the second leg 28 define a slot 42, approximately 3/8 inches (about 1 cm) wide, which matches the effective width of a top section of the bucket sidewall 20, in the illustrated embodiment. The slot 42 receives the sidewall 20 of the bucket B.

A bridge 44 connects the first and second legs 12, 28. The bridge 44 spans the top end 24 of the first leg 12 and the upper end 38 of the second leg 28. The bridge 44 is planar having a generally triangular shape. The triangular bridge 44 has an upright side 46 and a canted side 48. The canted side 48 is disposed at an angle approximately 120° relative to horizontal. A semicircular section 52 at the top of the bridge 44 connects the upright side 46 and the canted side 48. A curved recess 54 which has a diameter matching the effective width of the slot 42 is defined at the top of the slot. Although a substantially triangular bridge 44 has been described as the preferred connecting member, it will be appreciated that any appropriate member which connects the first and second legs 12, 28 is contemplated.

An arm 60 extends upward from the upper end 38 of the second leg 28. The arm 60, preferably, has a lower portion 62 and an upper portion 64. The lower and upper portions 62, 64 each have an inner side 66, 68 and an outer side 70, 72, respectively. The lower portion 62 extends upward from the upper end 38 of the second leg 28 at an angle directed away from the first leg 12. In the preferred embodiment, the angle of the lower portion 62 is 75° relative to horizontal. In addition, the slope of the outer side 70 of the lower portion 62 is equal to the slope of the sloped edge 32 of the second leg 28. The upper portion 64 of the arm 60 extends upward from the lower portion 62 of the arm at a negative angle. The inner side 68 of the upper portion 64 is, preferably, disposed parallel to the canted side 48 of the bridge 44 at an angle approximately 120° relative to horizontal.

The inner sides 66, 68 of the lower and upper portions 62, 64 of the arm 60 and the canted side 48 of the bridge 44 define an angled channel 74 for receiving and supporting the fishing rod F. The depth of the channel 74 is preferably between 3/4 inches and two inches (1–5 cm). However, other depths are within the scope of the present invention. The canted side 48 of the bridge 44 meets the inner side 66 of the lower portion 62 of the arm 60 at the bottom surface of the channel 74 forming a V-shaped groove 78 that receives the fishing rod F.

The elbow shape of the arm 60, described above, prevents the fishing rod from easily popping out of the channel 74. The upper portion 64 of the arm 60 is angled back in such a manner so as to close a part of the entrance to the channel 74. If the fishing rod is jarred or bumped, the downward canted inner side 68 of the upper portion 64 of the arm 60 deflects directly upward movement restraining the pole from leaving the channel 74.

The bottom end 26 of the first leg 12 defines an aperture 80 for receiving a rope or a stringer (not shown), or the like. While fishing, it is often useful to string the fish on a rope or stringer and place them in a bucket of water to keep them fresh. The aperture 80 in the first leg provides a convenient place to secure a stringer or rope for such purposes. Optionally, a bottle opener (shown in phantom) may be defined in one of the legs. Since the second leg 28 is more accessible to the fisherman, it would be most convenient to provide the bottle opener on to the second leg 28.

In operation, the first leg 12 and the second leg 28 are slid over the sidewall 20 of the bucket B in such a manner that the slot 42 receives the sidewall 20 of the bucket. The first and second legs 12, 28 essentially straddle the sidewall 20.

When the fishing rod holder is used in conjunction with an annular support object such as a bucket or a pail, the inner edge 14 of the first leg 12 is in direct contact with the inner surface 18 of the bucket sidewall 20. Since a bucket or pail generally has a cylindrical shape, the first leg 12 is locked into a substantially vertical position. The circular shape of the bucket B prevents the holder from pivoting along a rim of the bucket. As the first leg 12 attempts to rotate about a horizontal axis, the curvature of the bucket-sidewall 20 thwarts any significant pivoting. It will be appreciated by one skilled in the art that a longer first leg 12 will decrease pivoting of the fishing rod holder and therefore enhance the stability of the fishing rod holder. In addition, the degree of curvature of the bucket directly relates to the required length of the first leg 12. A shorter first leg may be used in conjunction with a bucket having a greater degree of curvature without the rod holder experiencing pivoting. Thus, the fishing rod holder can be manufactured having a variety of different lengths.

Once the rod holder frictionally engages the sidewall 20, the fishing pole F is placed in the channel 74 defined by the inner sides 66, 68 of the arm 60 and the canted side 48 of the bridge 44. As noted earlier, the arm 60 is designed in the shape of an elbow so that the fishing pole will not be easily bumped out of the channel 74. The end of the fishing pole having the handle is placed on the ground or floor area causing the fishing rod tip to angle upward. Therefore, the fisherman may continue to fish without having to hold the fishing pole. In addition, more than one fishing rod holder can be frictionally engaged around the rim, therefore allowing a fisherman to fish with more than one fishing pole at once.

In the preferred embodiment, the fishing rod holder is formed from one piece of molded plastic. However, the rod holder may be formed from any appropriate material such as plastic resin or a combination of metallic or non-metallic materials. In addition, the fishing rod holder may also be manufactured from a wire material. The planar surface of the fishing rod holder makes the holder amenable to carrying advertising messages or logos. Moreover, the simplicity of manufacturing the present invention would enable an entity to produce and distribute large quantities of rod holding devices as promotional items without incurring much cost.

The invention has been described with reference to the preferred embodiments. Obviously modifications and alterations will occur to others upon reading and understanding the preceding detailed description. It is intended that the invention be construed as including all such modifications and alterations as they come within the scope of the appended claims or the equivalents thereof.

Having thus described the preferred embodiments, the invention is now claimed to be:

1. A fishing rod holder comprising:
   a first leg having an inner edge frictionally engageable with an inner surface of a vertical sidewall of a support object;
   a second leg disposed parallel to the first leg having an upright edge frictionally engageable with an outer surface of the vertical sidewall of the support object, the first leg and the second leg defining a slot;
   a bridge spanning a top end of the first leg and an upper end of the second leg interconnecting the first and second legs;
   an arm protruding upward from the second leg of the fishing rod holder having an inner side and an outer side and a first portion and a second portion, the first portion extending upward from the upper end of the second leg at an angle away from the first leg and the second portion extending upward from the first portion of the arm at an angle toward the bridge, the first portion and the second portion each having an inner edge and an outer edge; and
   a surface extending upward from the inner side of the arm, the surface and the inner side of the arm defining a channel.

2. The fishing rod holder according to claim 1, wherein the bridge includes at least one edge, the edge of the bridge being the surface extending upward from the inner side of the arm.

3. The fishing rod holder according to claim 1, wherein the inner edge of the second portion of the arm and the surface extending upward from the inner side of the arm are in parallel relation.

4. The fishing rod holder of claim 1, wherein the second leg includes a sloped edge disposed opposite the upright edge, the sloped edge having a slope equal to a slope of the outer side of the first portion of the arm.

5. The fishing rod holder according to claim 1, wherein the inner side of the arm and the surface extending upward from the inner side of the arm meet at a bottom surface of the channel to form a V-shaped groove.

6. The fishing rod holder according to claim 1, wherein the first leg is longer than the second leg.

7. The fishing rod holder according to claim 1, wherein the first leg, the second leg, the bridge and the arm are formed from one piece of molded plastic and is amenable to carrying advertising messages.

8. The fishing rod holder according to claim 1, wherein a bottom end of the first leg defines an aperture.

9. The fishing rod holder according to claim 1 further including:
   a bottle opener defined in one of the first and second legs.

10. A fishing rod holder comprising:
    a first leg having an inner edge for direct contact with an inner surface of a vertical sidewall of a support object;
    a second leg having a shorter length than the first leg and disposed parallel to the first leg, the second leg having an upright edge for direct contact with an outer surface of the vertical sidewall of the support object, the second leg having a sloped edge disposed opposite the upright edge of the second leg, the first leg and the second leg defining a slot;
    an elbow having:
       a first portion extending upward from the second leg at an angle away from the first leg, the first portion having an inner side and outer side, a slope of the outer side of the first portion of the elbow being equal to a slope of the second leg sloped edge;
       a second portion extending upward from the first portion of the elbow; and
    a bridge spanning a top end of the first leg and an upper end of the second leg interconnecting the first and second legs, the bridge having an edge extending upward from the inner side of the first portion of the elbow, the edge of the bridge and the inner sides of the first and second portions of the elbow defining a channel for receiving a fishing rod.

11. The fishing rod holder according to claim 10, wherein the edge of the bridge is at an angle away from the second leg.

12. A fishing rod holder comprising:
    a first leg having an inner edge for direct contact with an inner surface of a vertical sidewall of a support object;
    a second leg having a shorter length than the first leg and disposed parallel to the first leg, the second leg having an upright edge for direct contact with an outer surface of the vertical sidewall of the support object, the first leg and the second leg defining a slot;
    an elbow having:
       a first portion extending upward from the second leg at an angle away from the first leg, and a second portion extending upward from the first portion of the elbow, the first portion and the second portion each having an inner side and an outer side;

a bridge spanning a top end of the first leg and an upper end of the second leg interconnecting the first and second legs, the bridge having an edge extending upward from the inner side of the first portion of the elbow, the edge of the bridge and the inner sides of the first and second portions of the elbow defining a channel for receiving a fishing rod, the edge of the bridge being disposed parallel to the inner side of the second portion of the elbow.

13. The fishing rod holder according to claim 12, wherein the edge of the bridge and the inner side of the first portion of the elbow meet at a bottom surface of the channel to form a V-shaped groove.

14. The fishing rod holder according to claim 12, wherein a bottom end of the first leg defines an aperture.

15. The fishing rod holder according to claim 12, wherein the first leg, the second leg, the bridge, and the elbow are formed from one piece of molded plastic and are amenable to carrying advertising messages.

16. A fishing rod holder comprising:

a first leg having an inner edge frictionally engageable with an inner surface of a vertical sidewall of a support object;

a second leg disposed parallel to the first leg having an upright edge frictionally engageable with an outer surface of the vertical sidewall of the support object, the first leg and the second leg defining a slot;

an arm protruding upward from the second leg of the fishing rod holder having an inner side and an outer side;

a surface extending upward from the inner side of the arm, the surface and the inner side of the arm defining a channel;

a bridge spanning a top end of the first leg and an upper end of the second leg interconnecting the first and second legs, the bridge having a substantially triangular shape, the triangular bridge including:

a horizontal side having a first end and a second end interconnecting the first and second legs, a vertical side extending from the first end and forming a 90° angle with the horizontal side, and a canted side disposed opposite the 90° angle forming the hypotenuse of the triangular bridge, the canted side being the surface extending upward from the inner side of the arm.

17. The fishing rod holder according to claim 16, wherein the horizontal side of the bridge defines a recess having an effective width equal to the width of the slot defined by the first and second legs.

18. A portable fishing rod holding assembly comprising:

a bucket having a vertically upstanding sidewall with an inner surface, an outer surface, and a top edge;

a rod holder supported on the bucket, the rod holder including:

a first leg having an inner edge frictionally engaging the inner surface of the bucket sidewall;

a second leg disposed parallel to the first leg having an upright edge frictionally engaging the outer surface of the bucket sidewall, the first leg and the second leg defining a slot in which the bucket top edge is received;

a bridge spanning a top end of the first leg and an upper end of the second leg interconnecting the first and second legs and resting adjacent the bucket top edge;

an arm protruding upward from the second leg of the rod holder having an inner side and an outer side;

a surface extending upward from the inner side of the arm, the surface and the inner side of the arm defining a channel; and a fishing pole having a handle end to be supported on a ground surface and a mid portion for resting in the channel.

\* \* \* \* \*